United States Patent [19]

Flinchbaugh

[11] Patent Number: 4,685,070

[45] Date of Patent: Aug. 4, 1987

[54] SYSTEM AND METHOD FOR DISPLAYING, AND INTERACTIVELY EXCAVATING AND EXAMINING A THREE DIMENSIONAL VOLUME

[75] Inventor: Bruce E. Flinchbaugh, Dallas, Tex.

[73] Assignee: Texas Instruments Incorporated, Dallas, Tex.

[21] Appl. No.: 637,465

[22] Filed: Aug. 3, 1984

[51] Int. Cl.$^4$ ........................ G06F 15/62; G06F 15/68
[52] U.S. Cl. .................................. 364/522; 364/518; 364/521; 340/747; 367/68
[58] Field of Search ............... 364/518, 521, 522, 410; 340/747; 367/68–71

[56] References Cited

U.S. PATENT DOCUMENTS

| | | | |
|---|---|---|---|
| 3,638,178 | 1/1972 | Stephenson | 367/72 |
| 3,668,619 | 6/1972 | Dennis | 367/72 |
| 4,439,760 | 3/1984 | Fleming | 340/747 |
| 4,475,104 | 10/1984 | Shen | 340/747 |
| 4,484,187 | 11/1984 | Brown et al. | 340/747 |
| 4,509,043 | 4/1985 | Mossaides | 340/747 |
| 4,538,144 | 8/1985 | Yamagami | 340/747 |
| 4,574,357 | 3/1986 | Pastor et al. | 364/518 |
| 4,580,134 | 4/1986 | Campbell et al. | 340/747 |

OTHER PUBLICATIONS

"Three Dimensional Deta Input by Selection of Hierarchially Defined Blocks", Yamaguchi et al., *Eurographics 84* K.B0 and H. A. Tucker Elsevier Holland Science Publishers B. V. 1984.
"Two Display Algorithms for Octrees"; Oliver, *Eurographics 84*, K. B0 and H. A. Tucker, Elsevier Science Publishers B. V. (Holland), 1984.
"Experiences with New Image Component Algorithms", Samet., *Eurographic 84*; K.B0 and H. A. Tucker; Elsevier Science Publishers B. V., Holland 1984.

*Primary Examiner*—Gary Chin
*Assistant Examiner*—Danielle Laibowitz
*Attorney, Agent, or Firm*—Thomas G. Devine; Melvin Sharp; James T. Comfort

[57] ABSTRACT

A computer system displays, in two dimensions, a representation of a three-dimensional volume. The three-dimensional volume representation is a tessellation of cells, represented as three-dimensional units. The three-dimensional volume is represented by a plurality of digital numbers. A designator designates which of the digital numbers are to be represented in the two-dimensional display. Each digital number is represented by one cell. Also, each digital number represents a color. Each corresponding cell is colored in accordance with the digital number. A designator designates which of the digital numbers is to be represented by a cell in the three-dimensional representation. A cursor, controlled by a mouse, may be used to indicate which of the three-dimensional volume representation is to be excavated by indicating at the appropriate cells and then electronically ordering the excavation. The designator is changed thereby and the excavated cells are stripped away, exposing the cells immediately adjacent the excavated cells. The color of the cells indicates a parameter such as amplitude. The viewing angle of the three-dimensional volume representation is variable, allowing rotation in any direction of the three-dimensional display for examination of any surface.

11 Claims, 8 Drawing Figures

SYSTEM AND METHOD FOR DISPLAYING, AND INTERACTIVELY EXCAVATING AND EXAMINING A THREE DIMENSIONAL VOLUME

BACKGROUND OF THE INVENTION

1. Field of the Invention

This invention relates to a two-dimensional display of a three-dimensional volume representation and more particulary to such a representation where designated portions of the volume may be excavated, revealing the portion immediately adjacent the excavated portion.

2. Description of the Prior Art

Prior art displays have generally involved two-dimensional cross sections of three-dimensional arrays.

In more recent prior art systems, a three-dimensional rectangular solid is displayed with the visible sides having varying color in proportion to a selected parameter in the array along those sides.

Another prior art technique is to produce movies of successive-two-dimensional cross-sections of a three-dimensional array, effectively allowing the user to "drive through" the array.

These prior art methods tend to rely on the imagination of human interpreters to mentally construct three-dimensional models of the data, based on the two-dimensional cross sections.

The colored rectangular solid displays come closet to conveying the desired three-dimensional arrangements, but still rely on imagination to appreciate the overall three-dimensional structure of the data on the basis of the sides of the rectangular solids.

BRIEF SUMMARY OF THE INVENTION

A computer system receives a three-dimensional array, representing a three-dimensional volume. The three-dimensional array is stored in memory in the form of a plurality of digital numbers. A designator, in the form of a three-dimensional array of bits, has each bit assigned to represent one digital number in the three-dimensional array. A color is assigned to each digital number.

A two-dimensional display is employed to show a three-dimensional representation. This three-dimensional representation is a tessellation of cells, each cell representing one of the digital numbers. The cell is colored to correspond to the associated digital number. The color may be a shading from black to white in a black and white display and may be any selection of colors in a color display.

In this preferred embodiment, the three-dimensional array is in the form of a rectangular solid and each cell is also in the form of a rectangular solid. The designator array of bits designates which of the cells will be displayed. In this preferred embodiment, a "0" bit designates that the cell will not be displayed while a "1" bit designates that the cell will be displayed. A cell which is designated for display will not actually be visible in the display if other designated cells occlude it. A movable cursor is provided in the two-dimensional display. In this preferred embodiment, a mouse controls the movement of the cursor. To excavate a portion of the volume, the user moves the cursor and points to a cell by moving the mouse, to excavate a single column of cells, or to two cells to define the limits to be excavated. The excavation is done by activating a switch on the mouse which then enables the system to set all of the designator array bits to "0" for those bits corresponding to cells to be excavated. The two-dimensional display of the three-dimensional representation is then redrawn to comply with the designator array as altered by the excavation to then illustrate the three-dimensional representation revealing those cells immediately adjacent the excavated cells, but not formerly visible.

The three-dimensional viewing angle may be changed by the system to show the three-dimensional volume representation from any desired angle. The three-dimensional volume representation may therefore be effectively rotated in any direction to permit the user to see any side.

The principal object of this invention is to provide a three-dimensional representation on a two-dimensional display of a three-dimensional array wherein desired portions may be excavated to reveal the underlying portions.

Another object of this invention is to provide a three-dimensional representation on a two-dimensional display formed by a tessellation of cells, selected cells being removable when an excavation is made.

Still another object of this invention is to provide a display wherein the cells are colored in accordance with corresponding digital numbers in a three-dimensional array.

These and other objects will be made evident in the detailed description that follows.

DETAILED DESCRIPTION OF THE INVENTION

Figure 1:
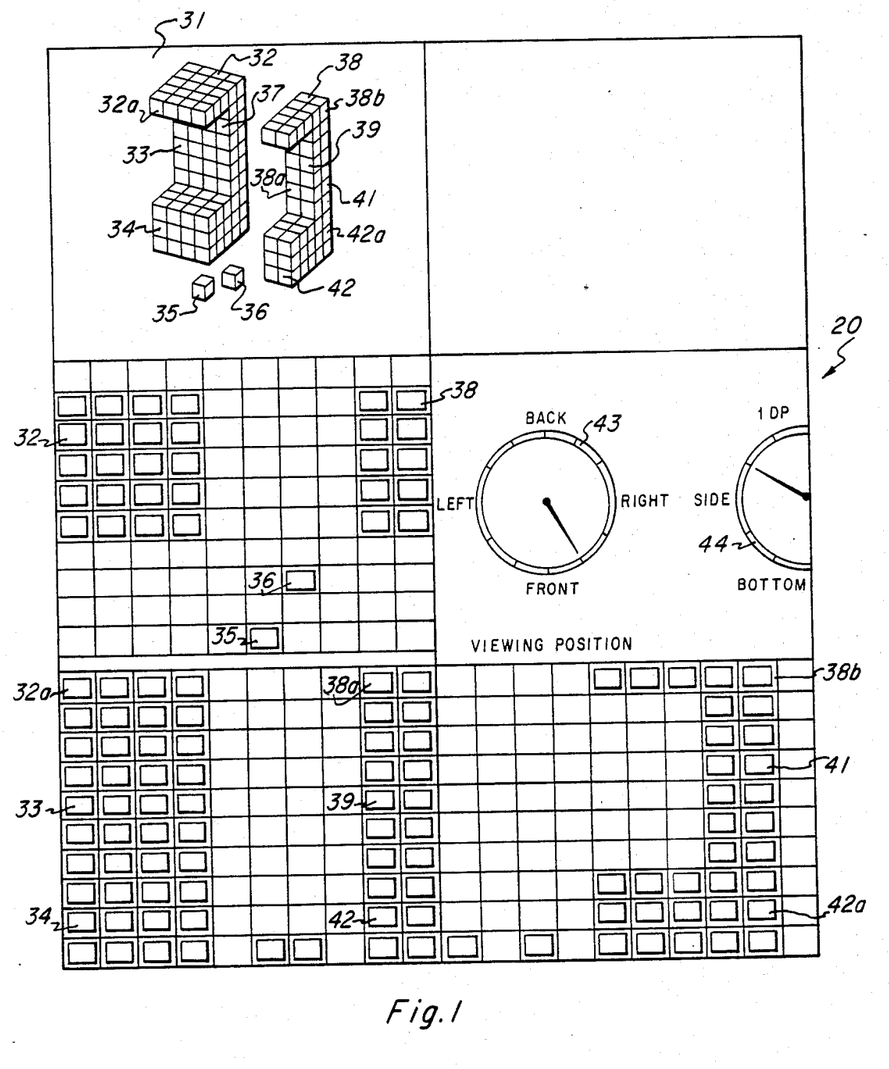
FIG. 1 illustrates a typical cathode array tube (CRT) display of this invention.
Figure 4:
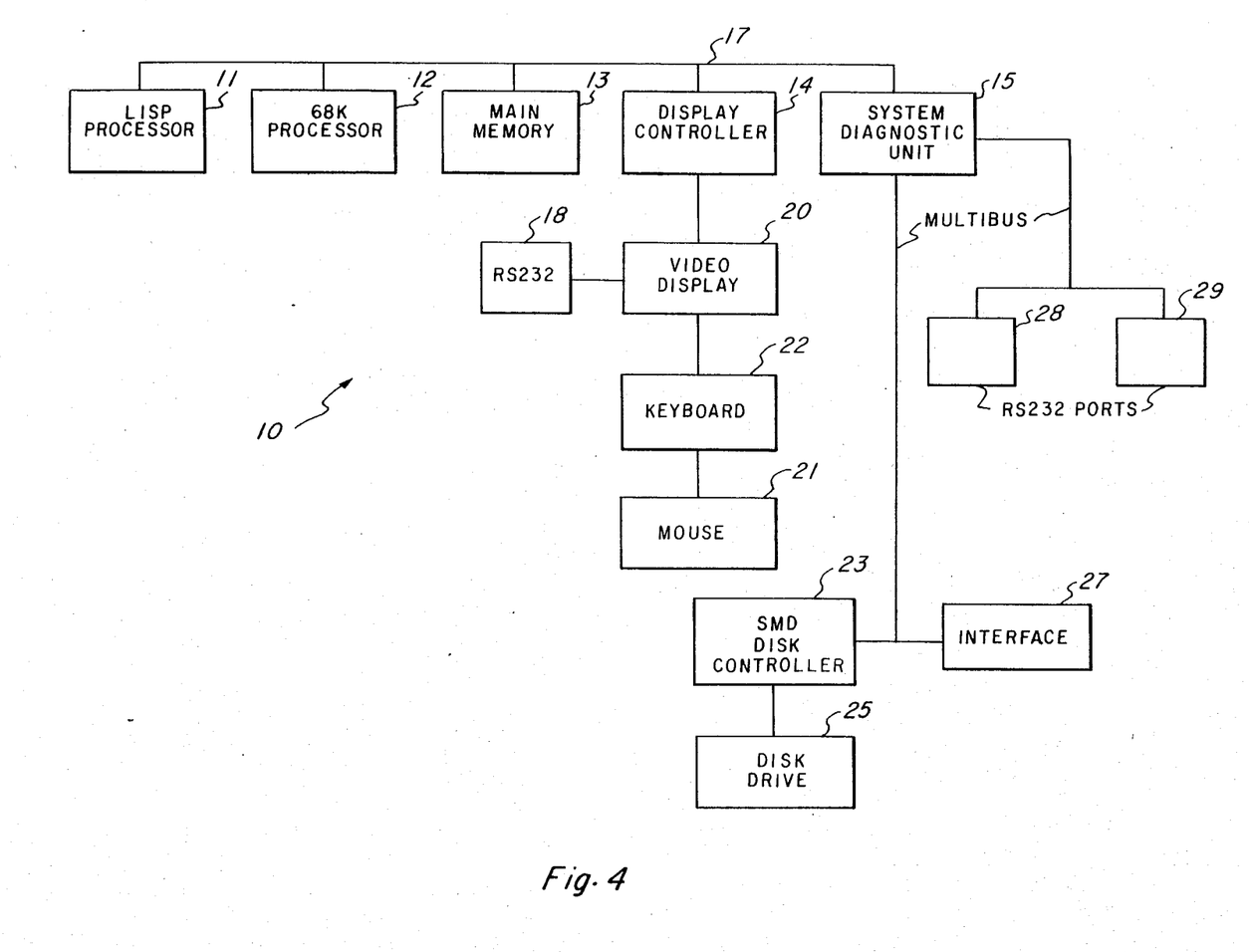
FIG. 4 is a block diagram of the computer system of this invention.

FIG. 1 illustrates a typical presentation on the video display 20 of the Lisp computing system 10 shown in FIG. 4. The system used in this preferred embodiment is a LAMBDA computing system from Lisp Machine, Inc., designed for execution of LISP program instructions. The LAMBDA system and the use of the LISP programs are set out in detail in the following manuals of Lisp Machine, Inc.:

"Introduction to the Lisp System"—1983;
"ZMACS-Instroductory Manual"—1983;
"ZMAIL Manual"—April 1983;
"Window System Manual"—August 1983;
"Lisp Machine Manual"—January 1983;
"System 94 Release Notes—Undated Field 31a contains a three-dimensional (3-D) representation of a 3-D volume. As shown in FIG. 1, this 3-D representation has been excavated to display the volumes shown as 30a, 30b, 35 and 36. Before the excavation, the display would have typically been of a 3-D representation of a rectangular solid. The rectangular solid is a tessellation of cells such as 35, 36, which in this preferred embodiment, are also rectangular solids. In the accompanying Lisp program, the cells are referred to as "voxels".

Field 31b is a top view of the 3-D representation of field 31a illustrating top surfaces 32 and 38, as well as the individual cells 35 and 36.

Field 31c is a front view of the 3-D representation of field 31a illustrating solids 30a and 30b, and cells 35 and 36.

Field 31d is a right side view of the 3-D representation of field 31a with volume 30b visible, along with cells 35 and 36.

Finally, field 31e illustrates a positioning mechanism for specifying viewing the front, left, back and right sides by indication on dial 43. The top, bottom and side may be viewed by indication on dial 44.

The computer system includes a cursor which is movable in the face of the display by moving mouse 21 of FIG. 4. The cursor (not shown) may point at any specific cell in any of fields 31a–31d. By pointing at the cells which define a desired volume to be removed, an excavation is then electronically accomplished by activating a switch on the mouse 21. This program is described in detail. Also, the program for causing the viewing angle to change via dial 43 and dial 44 is explained in detail.

Figure 2A:
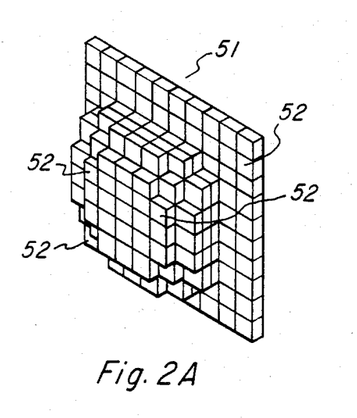
FIG. 2a illustrates a three-dimensional representation made up of rectangular solid cells.

FIG. 2a illustrates a three--dimensional representation after an excavation has been performed showing solid object 51 with cells 52.

Figure 2B:
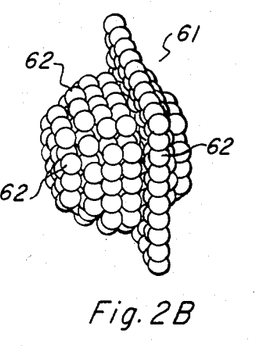
FIG. 2b illustrates the representation of FIG. 2a, but using spherical cells.

FIG. 2b shows a similar structure, but from a different view angle and also using spheres 62 as the cell configuration in place of the rectangular solid cells 52 of FIG. 2a. The rectangular solid is the preferred cell in this embodiment, spheres or other geometric volumes could be used.

Figure 3A:
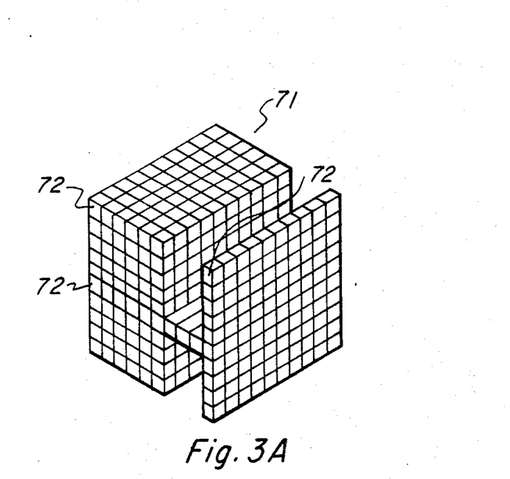
FIGS. 3a and 3b illustrate a three-dimensional representation from different viewing angles.

FIG. 3a shows a three-dimensional representation 71 made up of rectangular solid cells 72.

Figure 3B:
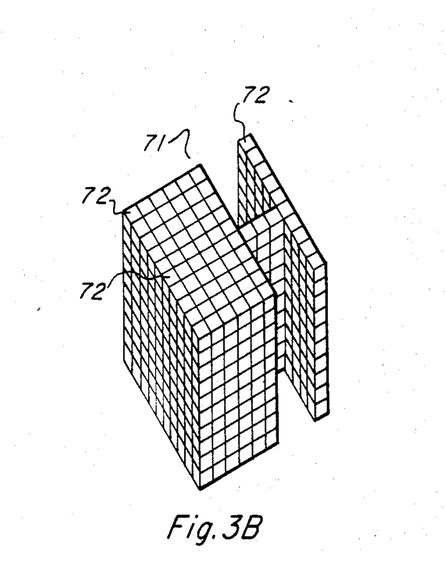

FIG. 3b shows that the same three-dimensional representation 71 with cells 72 from a different viewing angle.

The displays of FIGS. 2a–2b and FIGS. 3a–3b are not shown in color or in shading. It should be noted, however, that the cells are customarily colored in accordance with designating digital numbers. It should also be noted that in this preferred embodiment, seismic data provides the three-dimensional source data. Any other appropriate data would serve as well. For example, Nuclear Magnetic Resonance (NMR) imagery is contemplated.

FIG. 4 illustrates the LISP machine of this invention. In block form, a LISP processor 11 is connected via bus 17 (a Texas Instruments NUBUS type bus to a Motorola 68,000 processor 12, main memory 13, display controller 14 and system diagnostic unit 15. The main memory 13 stores the three-dimensional data array and the designator bit array. A display controller 14 controls video display 20 which is connected to RS232 interface 18. Keyboard 22 and mouse 21 are interfaced to the video display 20. The details of system 10 may be referred to in the aforementioned LISP Machine, Inc. publications.

MODE OF OPERATION

Figure 5:
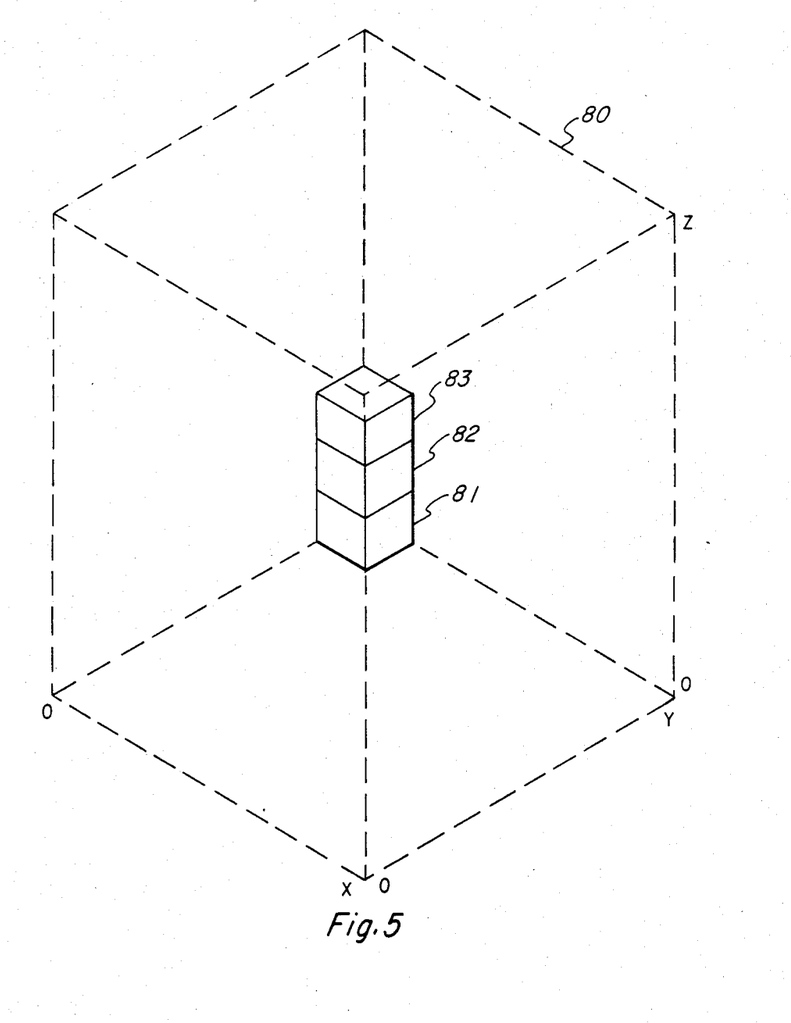
FIG. 5 illustrates the creating of the three-dimensional representation.
Figure 6:
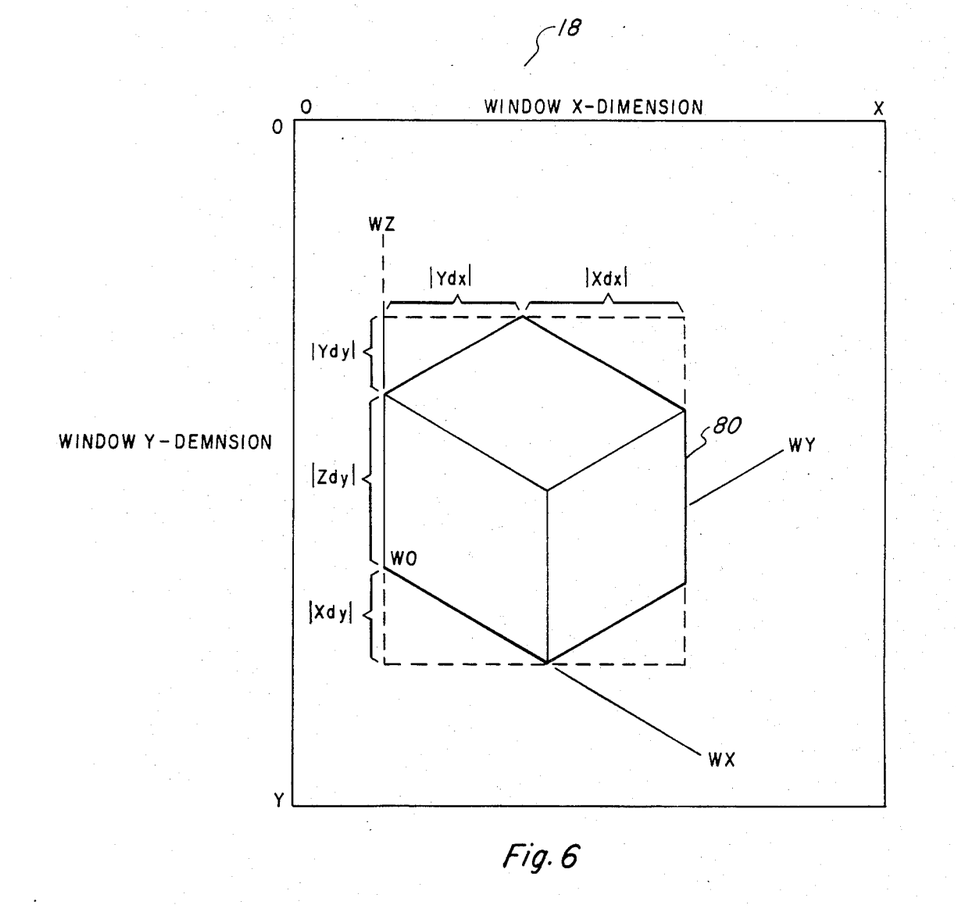
FIG. 6 shows the measurement requirements for creating the three-dimensional cell.

Please refer to FIGS. 5 and 6, in particular, together with the other figures, for an understanding of the operation of this invention.

Referring to the LISP program listing which is set out in the Appendix and incorporated herein by reference, programs VIS001.LSP-VIS012.LSP are seen to provide the entire program for the system. With respect to programs VIS008.LSP and VIS010.LSP, entitled "Volume-Display-Method.Lisp", the following description of the method contained in these two programs is set out in detail.

Data Array:

A 3D array (volume) of numbers (e.g. 3D seismic or NMR data). Note: In the program the Data Array is referred to as the VOXEL-COLOR, a 3D array of integers in [0:15]. To diplay a different range of values using this program, the data must first be converted to an array containing numbers in [0:15]. The [0:15]numbers correspond to the sixteen colors of the particular display software used by the program.

Designator Array:

A 3D array of bits, one bit for each datum in the Data Array. A one-bit designates the corresponding datum to be included in the display, and a zero-bit designates that it will not be included. A datum which is designated for display will not actually be visible in the display if other designated data occlude it. Note: In the program the Designator Array is referred to as the POINT-ARRAY.

Viewing Angles:

Two angles, theta and phi, respectively specify the vertical and horizontal components of the 3D viewing angle, as in a sperical coordinate system. The X and Y axes of the Data Array are arbitrarily regarded as lying in a horizontal plane, and the positive direction along the (vertical) Z dimension is regarded as pointing upward. Note: Theta and phi can be converted to a VIEW-VECTOR, the actual input expected by the program, using the VIEW-ANGLE function (in file: VIEW-ANGLE).

Window:

Note: In the program, a Lisp Machine window must also be given. It specifies where the display will be drawn.

Each cell of the Data Array is displayed as a small cube or sphere (voxel) when the corresponding Designator Array bit is one (1). The displayed color or shade of the voxel is specified by the corresponding number in the Data Array. Thus when all designator bits are one (1), the display appears as a large rectangular solid with a colored surface that varies in proportion to the corresponding Data Array values. When all designator bits are zero, nothing appears in the display. The primary use of this method is to examine volumes by selecting some designator bits to be one (1) and others to be zero, resulting in a display representing a carving of the Data Array into arbitrary 3D shapes, voxel by voxel.

The program draws all voxels designated for display, although some voxels may not be visible when the display method is finished. That is because voxels are drawn in an order scanning the Data Array "from farthest to nearest" with respect to the viewer, to eliminate hidden voxels from view. FIG. 5 illustrates cells 81, 82, and 83 being created in the farthest corner of prospective 3-D representation 80. First, cell 81 is created, then 82, 83, and so on, until the column is completed. Then, the next designated adjacent column is created.

One of the problems solved by the COMPUTE-ORIGIN-AND-VIEWING-CONSTANTS method in the program is to determine an appropriate size for each voxel so that the display of the entire volume will fit in the window. The summary of the method below is simplified by assuming that the window is big enough to accommodate an arbitrarily chosen voxel size.

The technique used by the program to display each individual voxel picture (using a series of Lisp Machine BITBLT operations) is not explained in detail because it is a state-of-the-art techique, employed for example in part by the Lisp Machine system when it moves a blinker (cursor) to follow the mouse input device.

STEP 1: Let XMAX, YMAX, and ZMAX be the maximum subscripts of the Data Array in the three dimensions. The minimum subscript of each dimension is zero. Let VIEW-VECTOR=(A B C) be a vector pointing in the direction of gaze (this represents the viewing angle).

STEP 2: Compute the SCAN-ORDER. That is, determine an order for scanning the Data Array "from farthest to nearest" with respect to the viewer. The scan order is represented as a list of three numbers, (DX DY DZ). DX=1 indicates that the scan order, with respect the the X axis, proceeds in the positive direction (from 0 to XMAX), and DX=−1 indicates that the X axis is scanned in the negative direction (from XMAX to 0). Similarly, DY and DZ represent the scan order with respect to the Y and Z axes.

DX=−1 if A>=0; otherwise DX=1.
DY=−1 if B>=0; otherwise DY=1.
DZ=−1 if C>=0; otherwise DZ=1.

STEP 3: Let AO=(0 0 0) be the 3D coordinates of the Data Array origin, and let AX, AY, and AZ be (XMAX 0 0), (0 YMAX 0), and (0 0 ZMAX), respectively. Note: In the program the VERTICES indicated as P0, PX, PY, and PZ represent the same points as AO, AX, AY, and AZ, except there the origin of the array is regarded as being at the center of the array instead of at (0 0 0). The program uses the other origin as part of a scheme for centering the center of the Data Array in the window regardless of the particular designator and viewing angle.

STEP 4: Compute the image of AO, AX, AY, and AZ. Using a version of orthographic projection in which the vertical axis of the image lies in a plane with the Z axis of the Data Array, the four points are mapped into WO=(wxo,wyo), WX=(wxx,wyx), WY=(wxy,wyy), and WZ=(wxz,wyz), according to the VIEW-VECTOR. Note: In the program, the VIEW-TRANSFORMATION function performs the projection. The WINDOW-TRANSFORMATION function is part of the scaling to translate the image coordinates into window coordinates. Without loss of generality, the rest of this discussion assumes that WO, WX, WY, AND WZ are in window coordinates.

STEP 5: Compute five constants, Xdx, Ydx, Xdy, Ydy, and Zdy, corresponding to the distances in the FIG. 6. The drawing illustrates one voxel depicted as a small cube. The importance of the five constants is that they describe the directional displacements in the image between adjacent voxels. Zdy describes the vertical displacement (dy) of two voxels in the image due to a unit displacement in the scanning direction along the Z axis of the Data Array, i.e. the displacement between two voxels corresponding to Data Array positions, (X,Y,Z) and (X,Y,Z+DZ). (Xdx Xdy) describes the combined horizontal (dx) and vertical (dy) displacement of two voxels due to a unit displacement along the X axis of the Data Array. Similarly, (Ydx Ydy) describes the combined horizontal (dx) and vertical (dy) displacement of two voxels due to a unit displacement along the Y axis of the Data Array. The five constants can be computed using the SCAN-ORDER, WO, WX, WY, WZ, XMAX, and ZMAX as follows, where the asterisk denotes multiplication:

$$Zdy = DZ * \frac{Wyz - Wyo}{ZMAX}$$

$$Xdx = DX * \frac{Wxx - Wxo}{XMAX}$$

$$Xdy = DX * \frac{Wyx - Wyo}{XMAX}$$

$$Ydx = DY * \frac{Wxy - Wxo}{YMAX}$$

$$Ydy = DY * \frac{Wyy - Wyo}{YMAX}$$

STEP 6: Compute a picture of the voxel. The particular picture used to represent each voxel is arbitrary. Drawing small cubes produces attractive displays. The picture only needs to be computed once and saved for replication, since under orthographic projection the shape and size of each Data Array cell is the same. The coloring or shading of voxels in accordance with the Data Array values is accomplished separately during the innermost loop of Step 8.

Note: In the program, cube pictures are computed by the CREATE-CUBE-PICTURE method of the UNIT-CUBE flavor, and sphere pictures are created by the CREATE-SPHERE-PICTURE function. Both of these procedures are straightforward exercises for students of computer graphics. Each routing actually returns two pixel arrays to represent the voxel. One is called the PICTURE (which may be thought of as a line drawing of the voxel) and the other is called the MASK (which may be thought of as a silhouette view of the voxel). The MASK designates the area of the rectangular array that PICTURE occupies, e.g. for a Lisp Machine ART-1B pixel array the MASK has one (1) bits everywhere the voxel is depicted as opaque. In the innermost loop of Step 8, the MASK is used to erase the appropriate area of the window in preparation for inserting the PICTURE, using a series of calls to the Lisp Machine BITBLT function.

STEP 7: Determine the ORIGIN=(Ox Oy) in the image where the first voxel will be drawn. The ORIGIN is computed from WO, WX, WY, and WZ using the signs (plus or minus) of DX, DY, and DZ, by the relationship in the following table, where the operations are vector addition and subtraction.

| DX | DY | DZ | => | ORIGIN |
|---|---|---|---|---|
| + | + | + |   | WO |
| + | + | − |   | WZ |
| + | − | + |   | WY |
| + | − | − |   | WY + (WZ − WO) |
| − | + | + |   | WX |
| − | + | − |   | WX + (WZ − WO) |
| − | − | + |   | WX + (WY − WO) |
| − | − | − |   | WX + (WY − WO) + (WZ − WO) |

STEP 8: Scan the Designator Array and Data Array in the scanning order, drawing the voxel picture for each designated datum in sequence. This step is extremely efficient since the positions of voxels in the window can be determined with just a small number of additions and comparisons per voxel, and because the series of BITBLT operations used to copy each voxel picture into the screen exploits the speed of BITBLT.

This step consists of three nested loops. The outermost loop steps X along the X axis of the Data Array and keeps track of the displacement of each voxel from the ORIGIN due to the displacement of X along the X axis. The middle loop steps Y along the Y axis and keeps track of the displacement from the ORIGIN due to the displacement of Y. The innermost loop steps Z along the Z axis, keeps track of the displacement due to Z, and draws the voxel at the window position corresponding to Data Array position (X Y Z) when the (X Y Z) designator bit is one (1). An abstract of the important portions of the Lisp program implementing the three nested loops is given below. This abstract only illustrates the special case occuring when the SCAN-ORDER=(DX DY DZ)=(1 1 1), and uses th notation consistent with this summary of the Volume Display Method (which differs somewhat from the notation in the full version of the program). The full version of the program implements the general case where the SCAN-ORDER values may have other signs.

```
(loop for X from 0 to XMAX by DX
    as WXx = Ox then (+ WXx Xdx)
    as WXy = Oy then (+ WXy Xdy) do
    (loop for Y from 0 to YMAX by DY
        as WYx = WXx then (+ WYx Ydx)
        as WYy = WXy then (+ WYy Ydy) do
        (loop for Z from 0 to ZMAX by DY
            as WZy = WYy then (+ WZy Zdy) do
            ;At this point, when the Designator Array bit
            ;at (X Y Z) is one (1), the voxel picture is
            ;copied into the window at (WYx WZy): A
            ;series of BITBLT operations on PICTURE and
            ;MASK is performed to produce a picture in the
            ;color specified by the number in the Data
            ;Array at (X Y Z).
```

VIS001.LSP is entitled "Array-Display, Lisp". This program is employed in the system to implement the display of the top, front, and sides view in fields 31b, 31c and 31d, respectively, of FIG. 1. This short program defines a virtual window of an array that is updated when the array itself is altered as by an excavation procedure.

The virtual window technique is set out in program VIS009.LSP entitled "Virtual-Windows. Lisp". The virtual window system is described in the introductory material to the program VIS009.LSP.

Program VIS003.LSP entitled "Color-Graphics.-Lisp" is a low level primitive program which is used for drawing each cell and is employed in program VIS010.LSP—entitled "Volume-Display Method.-Lisp", previously described.

Program VIS004.LSP entitled "Dashboard-Dials.-Lisp" is a program for drawing the dials as shown in field 31e of FIG. 1.

Program VIS005.LSP entitled "Mouse-Handler-Mix-in.Lisp" and program VIS006.LSP entitled "Mouse-Handler-Utilities.Lisp" describe a method for moving and operating mouse 21 of FIG. 4. As indicated earlier, a cursor is employed to point to cells in any of fields 31a–31d of FIG. 1 and also to desired directions in field 31e. In general terms, a cell may be created or deleted by "clicking" the mouse on cells of the solid object in field 31a. The first click highlights a cell at one corner of a rectangular volume to be created or deleted, and the second click specifies the opposite corner and performs the operation. In this particular embodiment, the left mouse button is for creating and the middle button is for deleting. A single click specifies the visible cell at the mouse cursor and a double clock specifies an empty cell location closest to the viewpoint at the mouse cursor. A triple click cancels a partially completed operation. These particular combinations are, of course, completely arbitrary and could obviously be rearranged to perform the same functions.

Also, cells can be created or deleted by specifying opposite corners of a rectangle in one of the three mutually orthogonal silhouette view windows illustrated in fields 31b–31d. In this case, cells are created or deleted at all cell locations in-line with the specified rectangle from that point of view. For example, when a rectangle is specified in the top view field 31b, all cells in the columns directly under the rectangle are affected. The first click of the mouse marks the position of one corner and the second click marks the opposite corner of the rectangle (which may degenerate to a single element or row). Both clicks must be of the same type (left: create or middle: delete). A double click cancels a partially completed operation. A cell can be created or deleted at a single point by clicking the two points in different orthogonal views.

With respect to field 31e, the angle from which the 3-D display is viewed is changed by clicking the dials in the viewing position window 31e. The dials are designed as if the object is at the center of each dial and the viewpoint is on the perimeter. Dial 43 controls the horizontal component of the viewing position, while dial 44 specifies the vertical component. Thus, to look at the right, front, and top sides of an object, click the mouse at dial 43 between RIGHT and FRONT, and click at dial 44 between the SIDE (horizontal position) and the TOP (looking straight down) position.

The program VIS003.LSP entitled "Color-Graphics.Lisp" controls how the cells are colored, either collectively or individually. For example, a list of six colors, one for each of the six faces, causes cube cell faces to be uniformly colored—all Right faces are, for example, blue while all Top faces are red. Cells can also be individually colored by specifying a 3-D array of colors where the color of a cell is the color in the color array position corresponding to the cell position in the 3-D bit array.

Program VIS007.LSP entitled "Movie.Lisp" provides for producing two types of movies: (1) the object rotating in place, and (2) a scan of the object as it appears while it is being drawn one frame per plane of the solid object.

Movies of the object rotating in place are made by specifying a starting viewing position and a final view (the last frame of the movie). The N frames of the movie are then interpolated between the two views; the horizon viewing position from dial 43 advances counter-clockwise. The starting view is specified before performing the make movie command. After clicking the make movie option, another window provides for optionally changing some default parameters of the movie (e.g. the number of frames). After leaving that window, the program solicits the final view specification as specified in field 31e. Clicking the middle button of the mouse 21 produces the movie; clicking the Right button aborts the procedure.

The scanning movies depict the solid object as it is being drawn, one frame per plane, in any of six scanning directions (i.e., top-to-bottom, right-to-left, etc.). Scanning movies allow extremely rapid browsing of planar sections of the object, incrementally building up and tearing down the solid object plane by plane (frame by frame).

When the Show Movie option is selected, a move dial appears in the viewing position window 31e for controlling the showing of the movie interactively using the Movie Display system on the Lisp machine.

Program VIS011.LSP entitled "Volume Inspector Method.Lisp", as can be seen, is the program employed for the excavation feature. The method of this program is described above.

Finally, program VIS012.LSP entitled "Windows.-Lisp" is a low level primitive program for creating the windows in FIG. 1 to contain fields 31a–31e, plus the blank field.

The particular programming language and the hardware set out above are exemplary and are not intended to limit this invention. It is contemplated that transformation of programming language and substitution of computer components is certainly within the realm of those skilled in the art. The invention is limited only by the appended claims.

We claim:

1. A computer system for displaying and for interactively excavating and examining a three-dimensional volume, comprising:
   (a) a source of three-dimensional arrays of data;
   (b) designator means for selectively designating all or any desired part of the three dimensional data to be presented; and
   (c) interactive, visual display means, responsive to the designator means, for presenting in two-dimensions a three-dimensional representation of any desired part of the three-dimensional data including drawing means for displaying the three-dimensional volume as a tessellation of cells corresponding to the designation by the designator means.

2. A computer system for displaying and for interactively excavating and examining a three-dimensional volume, comprising:
   (a) a source of three-dimensional arrays of data including a data memory means storing a three-dimensional array of numbers;
   (b) designator means for selectively designating all or any desired part of the three dimensional data to be presented including a designator memory means storing a three-dimensional array of bits, each bit designating a single one of the numbers; and
   (c) interactive, visual display means, responsive to the designator means, for presenting in two-dimensions a three-dimensional representation of any desired part of the three-dimensional data, including drawing means for displaying the three-dimensional volume as a tessellation of cells corresponding to the designated bits of the designator memory means.

3. A computer system for displaying and for interactively excavating and examining a three-dimensional volume, comprising:
   (a) a source of three-dimensional arrays of data;
   (b) designator means for selectively designating all or any desired part of the three dimensional data to be presented; and
   (c) interactive, visual display means, responsive to the designator means, for presenting in two-dimensions a three-dimensional representation of any desired part of the three-dimensional data, including drawing means for displaying the three-dimensional volume as a tessellation of cells corresponding to the designation by the designator means; and manually operable electronic means for interacting with the display of the solid tessellation of cells for indicating a cell or cells to be excavated.

4. A computer system for displaying and for interactively excavating and examining a three-dimensional volume, comprising:
   (a) a source of three-dimensional arrays of data including a data memory means storing a three-dimensional array of numbers;
   (b) designator means for selectively designating all or any desired part of the three dimensional data to be presented, including a designator memory means storing a three-dimensional array of bits, each bit designating a single one of the numbers; and
   (c) interactive, visual display means, responsive to the designator means, for presenting in two-dimensions a three-dimensional representation of any desired part of the three-dimensional data, including drawing means for displaying the three-dimensional volume as a tessellation of cells corresponding to the designated bits of the designator memory means, and electronic means for interacting with the display of the tessellation of cells for indicating a cell or cells to be excavated.

5. The system of claim 4 wherein the designator memory means is operatively connected to the electronic means to permit a bit-for-cell correspondence wherein a bit set to a first digital state designates a cell and a bit set to a second digital state designates no cell, and wherein the designator memory means is operatively connected to the electronic means for setting those bits to the second digital state to of the cells to be excavated.

6. The system of claim 5 wherein the interactive visual display means further comprises color means for color presentation of the tessellation of cells, wherein the color means is operatively connected to the data memory means and wherein each number corresponds to a desired color, for coloring each cell to correspond to its associated number.

7. The system of claim 4 wherein the interactive visual display means further comprises color means for color presentation of the tessellation of cells, wherein the color means is operatively connected to the data memory means and wherein each number corresponds to a desired color, for coloring each cell to correspond to its associated number.

8. A computer system for displaying and for interactively excavating and examining a three-dimensional volume, comprising:
   (a) a source of three-dimensional arrays of data including a data memory means storing a three-dimensional array of numbers;
   (b) designator means for selectively designating all or any desired part of the three dimensional data to be presented, including a designator memory means storing a three-dimensional array of bits, each bit designating a single one of the numbers; and
   interactive, visual display means responsive to the designator means, for presenting in two-dimensions a three-dimensional representation of any desired part of the three-dimensional data, wherein the interactive visual display means comprises drawing means for displaying the three-dimensional volume as a tessellation of cells corresponding to the designated bits of the designator memory means, and wherein the interactive visual display means further comprises color means for color presentation of the tessellation of cells, wherein the color means is operatively connected to the data memory means and wherein each number corresponds to a desired color, for coloring each cell to correspond to its associated number.

9. A method of displaying, and interactively excavating and examining a three-dimensional volume in a computer system, comprising the steps of:
(a) representing the three-dimensional volume as three-dimensional array of data wherein the data are numbers:
(b) designating all or any portion of the three-dimensional data desired to be displayed;
(c) presenting in two dimensions any portion of the designated three-dimensional data, including drawing a plurality of cells to form the two-dimensional presentation as a tessellation of the cells.

10. The method of claim 9 further comprising the steps of:
(d) indicating the cells to be excavated from the display of the tessellation of the cells;
(e) redesignating the three-dimensional data to be displayed by indicating the number that will not be represented by the cells to be excavated; and
(f) displaying the tessellation of cells not excavated.

11. The method of claim 10 further comprising the steps of:
(g) assigning a color representation of each number; and
(h) coloring each cell in correspondence with its associated number.

* * * * *